(12) United States Patent
Fujii et al.

(10) Patent No.: US 9,579,931 B2
(45) Date of Patent: Feb. 28, 2017

(54) PNEUMATIC TIRE

(71) Applicant: The Yokohama Rubber Co., LTD., Sandy, UT (US)

(72) Inventors: Hiroshi Fujii, Hiratsuka (JP); Masatoshi Kuwajima, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 116 days.

(21) Appl. No.: 13/629,381

(22) Filed: Sep. 27, 2012

(65) Prior Publication Data

US 2013/0075007 A1 Mar. 28, 2013

(30) Foreign Application Priority Data

Sep. 28, 2011 (JP) .................. 2011-213010

(51) Int. Cl.
*B60C 13/02* (2006.01)
*B60C 15/024* (2006.01)

(52) U.S. Cl.
CPC ............ *B60C 13/02* (2013.01); *B60C 15/024* (2013.01)

(58) Field of Classification Search
CPC ..... B60C 13/00; B60C 13/001; B60C 13/002; B60C 13/02; B60C 13/023; B60C 15/00; B60C 15/024
See application file for complete search history.

(56) References Cited

U.S. PATENT DOCUMENTS

2010/0000649 A1* 1/2010 Iwabuchi ...................... 152/523

FOREIGN PATENT DOCUMENTS

| EP | 2305491 | * | 4/2011 |
|---|---|---|---|
| EP | 2311654 | * | 4/2011 |
| JP | 4-43107 | * | 2/1992 |
| JP | H10-058925 | | 3/1998 |
| JP | 2000-79809 | * | 3/2000 |
| JP | 2000-190712 | * | 7/2000 |
| JP | 2008-24246 | * | 2/2008 |
| JP | 2008-068716 | | 3/2008 |
| JP | 2009-029379 | | 2/2009 |
| JP | 2004-268809 | * | 9/2009 |
| JP | 2010-030547 | | 2/2010 |
| JP | 2010-143420 | | 7/2010 |
| JP | 2010-260376 | | 11/2010 |
| JP | 2010-260378 | | 11/2010 |
| JP | 2011-105171 | | 6/2011 |
| WO | WO 2010/013453 | * | 2/2010 |

OTHER PUBLICATIONS

Japanese Office Action dated Aug. 13, 2013, 1 page, Japan.

* cited by examiner

*Primary Examiner* — Justin Fischer

(74) *Attorney, Agent, or Firm* — Thorpe North & Western

(57) ABSTRACT

A pneumatic tire including a plurality of protrusions and a plurality of recesses of at least one tire side portion. The protrusions are formed as convexities having a longitudinal shape in a predetermined direction. A region including the protrusions is provided on an outermost side in a tire radial direction. A region including the recesses is provided inward in the tire radial direction of the region including the protrusions.

19 Claims, 15 Drawing Sheets

| | Conventional Example | Comparative Example 1 | Comparative Example 2 | Comparative Example 3 | Comparative Example 4 | Working Example 1 | Working Example 2 |
|---|---|---|---|---|---|---|---|
| Outer side region in tire radial direction of tire side portion | None | Protrusions | None | Protrusions | Recesses | Protrusions | Protrusions (ground contact edge) |
| Inner side region in tire radial direction of tire side portion | None | None | Recesses | Protrusions | Recesses | Recesses | Recesses (rim check line) |
| Longitudinal direction dimension of protrusions (mm) | - | 10 | - | 10 | - | 4 | 4 |
| Protruding height of protrusions (mm) | - | 7 | - | 7 | - | 0.4 | 0.4 |
| Cross-sectional shape of protrusions | - | Quadrangular | - | Quadrangular | - | Quadrangular | Quadrangular |
| Depth of recesses (mm) | - | - | 7 | - | 7 | 0.4 | 0.4 |
| Volume variation in tire radial direction of recesses | - | - | Uniform | - | Uniform | Uniform | Uniform |
| Fuel economy | 100 | 100 | 100 | 101 | 101 | 100 | 100 |
| Pinch cut resistance | 100 | 101 | 98 | 101 | 98 | 101 | 101 |
| Load durability | 100 | 100 | 100 | 99 | 101 | 101 | 101 |

| | Working Example 3 | Working Example 4 | Working Example 5 | Working Example 6 | Working Example 7 | Working Example 8 |
|---|---|---|---|---|---|---|
| Outer side region in tire radial direction of tire side portion | Protrusions (ground contact edge) | Protrusions (ground contact edge) | Protrusions (ground contact edge) | Protrusions (ground contact edge) | Protrusions (ground contact edge) | Protrusions (ground contact edge) |
| Inner side region in tire radial direction of tire side portion | Recesses (rim check line) | Recesses (rim check line) | Recesses (rim check line) | Recesses (rim check line) | Recesses (rim check line) | Recesses (rim check line) |
| Longitudinal direction dimension of protrusions (mm) | 5 | 10 | 10 | 10 | 10 | 10 |
| Protruding height of protrusions (mm) | 0.4 | 0.5 | 10 | 7 | 7 | 7 |
| Cross-sectional shape of protrusions | Quadrangular | Quadrangular | Quadrangular | Triangular | Triangular (recessed arc) | Triangular (recessed arc) |
| Depth of recesses (mm) | 0.4 | 0.5 | 5 | 3 | 3 | - |
| Volume variation in tire radial direction of recesses | Uniform | Uniform | Uniform | Uniform | Uniform | Opening shape: Circular Opening radius (mm): 0.3 to 2 Depth (mm): 3 to 4 |
| Fuel economy | 100 | 102 | 102 | 103 | 104 | 105 |
| Pinch cut resistance | 101 | 101 | 103 | 103 | 103 | 103 |
| Load durability | 101 | 101 | 102 | 103 | 103 | 104 |

PNEUMATIC TIRE

PRIORITY CLAIM

Priority is claimed to Japan Patent Application Serial No. 2011-213010 filed on Sep. 28, 2011.

BACKGROUND

Technical Field

The present technology relates to a pneumatic tire and particularly relates to a pneumatic tire by which air flow around a tire can be improved.

Related Art

Japanese Unexamined Patent Application Publication No. 2010-260376A describes a conventional pneumatic tire including both a plurality of concave portions (recesses) and a plurality of convex portions (protrusions) throughout a tire circumferential direction and a tire radial direction in a predetermined region of a tire outer side surface for the purposes of effectively reducing air resistance around the tire and improving the fuel economy of a vehicle on which the tire is mounted.

Additionally, Japanese Unexamined Patent Application Publication No. 2010-30547A describes a conventional pneumatic tire including a plurality of concave portions (dimples) and convex portions (pimples) as agitators on a tire outer side surface (outer surface of side portions) for the purpose of preventing reduction in durability caused by heat buildup.

With the pneumatic tires described in Japanese Unexamined Patent Application Publication No. 2010-260376A and Japanese Unexamined Patent Application Publication No. 2010-30547A, it is recited that turbulent flow (agitation of air) around the tire is generated by the concave portions when the vehicle is traveling, and an increase in the effects of generating turbulent air (agitation effects) is sought by the convex portions. That is, the concave portions are described as portions that cause turbulent flow or agitate the air, and the convex portions are described as portions that promote the turbulent flow or agitation of the air.

SUMMARY

The present technology provides a pneumatic tire by which air flow around the tire can be further improved. A pneumatic tire of the present technology includes a plurality of protrusions and a plurality of recesses of at least one tire side portion. In such a pneumatic tire, the protrusions are formed as convexities having a longitudinal shape in a predetermined direction; a region including the protrusions is provided On an outermost side in a tire radial direction; and a region including the recesses is formed inward in the tire radial direction of the region including the protrusions.

According to this pneumatic tire, when a vehicle on which the pneumatic tire is mounted is traveling, the air can be made turbulent by the protrusions by providing the region including the protrusions on an outer side in the tire radial direction of the tire side portion that is prone to receiving air resistance and where rotation speed is relatively fast. Therefore, a turbulent flow boundary layer is generated in the region including the protrusions and the expansion of passing air is suppressed and, as a result, the air resistance of the vehicle is reduced and the fuel economy can be enhanced. On the other hand, when a vehicle on which the pneumatic tire is mounted is traveling, rubber volume of the tire side portion is reduced due to the recesses and the flow of air is made turbulent by providing the region including the recesses in the inner side in the tire radial direction of the tire side portion, where the rotation speed is relatively slow. Therefore, tire heat buildup and temperature increases can be suppressed and the durability of the tire can be enhanced because heat dissipation is enhanced due to the air being made turbulent while generation of heat is suppressed due to the reduction in rubber volume. As described above, with this pneumatic tire, the air flow around each tire can be further improved due to the protrusions on the outer side in the tire radial direction and the recesses in the inner side in the tire radial direction of the tire side portion.

Additionally, with the pneumatic tire of the present technology, in a state when assembled on a regular rim and inflated to an inner pressure of 5% of a regular inner pressure, the region including the protrusions is a range of at least 10% of a tire cross-sectional height outward from a ground contact edge of a tread portion in the tire width direction and inward from the ground contact edge in the tire radial direction; and the region including the recesses is a range of at least 10% of the tire cross-sectional height outward from a rim check line in the tire radial direction.

The range of at least 10% of a tire cross-sectional height outward from the ground contact edge of the tread portion in the tire width direction and inward from the ground contact edge in the tire radial direction is a portion in the tire side portion that is most prone to receiving the air resistance and where the rotation speed is fastest. By configuring this range to be the region including the protrusions, a prominent effect of reducing the air resistance of the vehicle can be obtained and the fuel economy can be further enhanced. On the other hand, the range of at least 10% of the tire cross-sectional height outward from the rim check line in the tire radial direction is a portion in the tire side portion where the rotation speed is slowest. By configuring this range to be the region including the recesses, a prominent effect of suppressing tire heat buildup and temperature increases can be obtained, and the durability of the tire can be further enhanced.

With the pneumatic tire of the present technology, a longitudinal direction dimension of the protrusions is not less than 5 mm.

If the longitudinal direction dimension of the protrusions is less than 5 mm, it will be difficult to obtain the effect of making the air turbulent by the protrusions. Therefore, configuring the longitudinal direction dimension of the protrusions to be not less than 5 mm makes it possible to make the air turbulent and obtain a prominent effect of reducing the air resistance of the vehicle.

With the pneumatic tire of the present technology, a protruding height of the protrusions is not less than 0.5 mm and not more than 10.0 mm.

If the height of the protrusions is less than 0.5 mm, a range of the protrusions that contacts the air will be small and, as a result, it will be difficult to make the flow of air turbulent and the effect of reducing the air resistance of the vehicle will decline. Additionally, if the height of the protrusions exceeds 10.0 mm, the range of the protrusions that contacts the air will be large and, as a result, the flow of air at the back of the protrusions will tend to expand and the effect of reducing the air resistance of the vehicle will decline. According to this pneumatic tire, the protrusions appropriately contact the air and, therefore, the flow of air is made turbulent and the expansion of the air at the back of the protrusions is reduced. As a result, a prominent effect of reducing the air resistance of the vehicle can be obtained.

With the pneumatic tire of the present technology, a longitudinal direction of the protrusions is disposed along the tire radial direction.

According to this pneumatic tire, the protrusions formed with a longitudinal shape in the tire radial direction have many faces facing the air passing around the tire and make the air more turbulent. Therefore, a prominent effect of reducing the air resistance of the vehicle can be obtained.

With the pneumatic tire of the present technology, a cross-sectional shape of the protrusions has a peak and progressively expands toward a bottom surface side.

According to this pneumatic tire, the cross-sectional shape of the protrusions that is orthogonal to the longitudinal direction resembles a triangle shape and, thereby, the volume of the protrusions is less compared to that of a rectangular cross-section or the like. As a result, the rubber volume of the protrusions is reduced and an increase in tire weight is suppressed and, therefore, the fuel economy can be further enhanced.

With the pneumatic tire of the present technology, a cross-sectional shape of the protrusions includes at least one arc.

According to this pneumatic tire, for example, the cross-sectional shape of the protrusions may be formed so as to expand using the arc or, the cross-sectional shape of the protrusions may be formed so that the arc is recessed. As a result, because the volume of the protrusions is less compared to that of a rectangular cross-section or the like, the rubber volume of the protrusions is reduced and an increase in tire weight is suppressed and, therefore, the fuel economy can be further enhanced.

With the pneumatic tire of the present technology, a depth of the recesses is not less than 0.5 mm and not more than 5.0 mm.

If the depth of the recesses is less than 0.5 mm, a range where an inner surface of the recesses contacts the air will be small and, as a result, it will be difficult to make the flow of air turbulent. Additionally, if the depth of the recesses exceeds 5.0 mm, the range where the inner surface of the recesses contacts the flow of air will be excessive and, in addition to the air resistance tending to increase, the original rubber volume in the region including the recesses will increase, which will lead to an increase in tire weight. According to this pneumatic tire, the inner surface of the recesses appropriately contacts the air and, therefore, the flow of air can be appropriately made turbulent. As a result, a prominent effect of enhancing heat dissipation can be obtained.

With the pneumatic tire of the present technology, the recesses are disposed such that a volume varies so as to progressively increase toward the inner side in the tire radial direction.

If the volume of the recesses is configured so as to progressively increase toward the inner side in the tire radial direction, the rubber volume of the portion on the inner side in the tire radial direction, where the volume of disposed rubber is relatively great and heat buildup is relatively great, will be reduced. Therefore, heat dissipation due the air being made turbulent can be further enhanced while the generation of heat is suppressed, tire heat buildup and temperature increases can be suppressed, and the durability of the tire can be further enhanced.

With the pneumatic tire according to the present technology, air flow around a tire can be further improved.

BRIEF DESCRIPTION OF THE DRAWINGS

FIGS. 26a-b include a table showing results of performance testing of pneumatic tires according to examples of the present technology.

DETAILED DESCRIPTION

An embodiment of the present technology is described below in detail based on the drawings. However, the present technology is not limited to this embodiment. The constituents of the embodiment include constituents that can be easily replaced by those skilled in the art and constituents substantially same as the constituents of the embodiment. Furthermore, a plurality of modified examples that are described in the embodiment can be freely combined within a scope of obviousness for a person skilled in the art.

Figure 1:
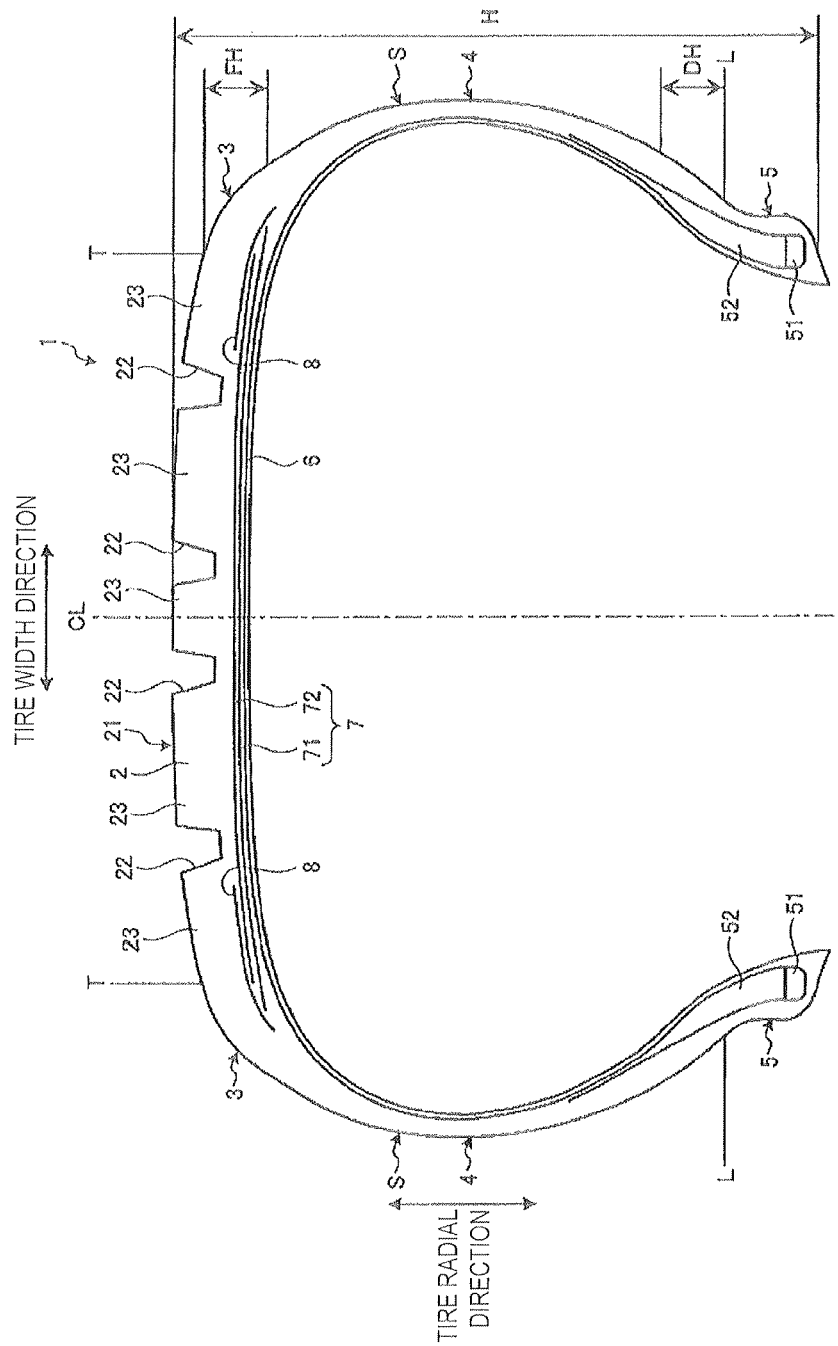
FIG. 1 is a meridian cross-sectional view of a pneumatic tire according to an embodiment of the present technology.
Figure 2:
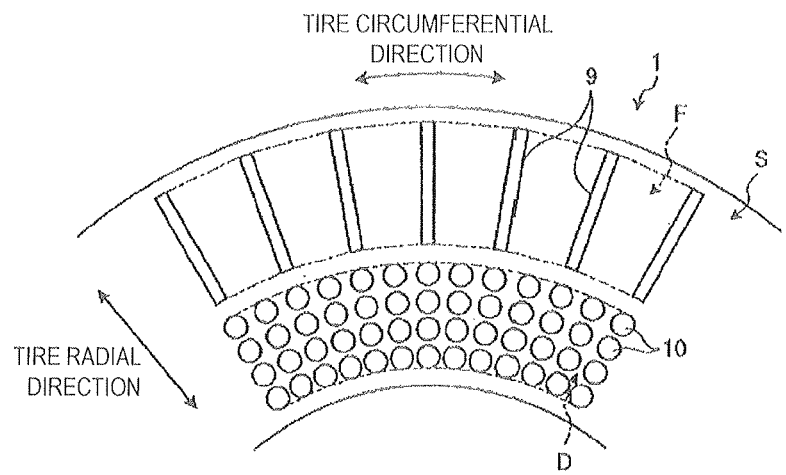
FIG. 2 is a partial perspective view of the pneumatic tire according to the embodiment of the present technology, viewed from a tire width direction.

FIG. 1 is a meridian cross-sectional view of a pneumatic tire according to this embodiment. In the following description, "tire radial direction" refers to a direction orthogonal to the rotational axis (not shown) of the pneumatic tire 1; "inner side in the tire radial direction" refers to the side facing the rotational axis in the tire radial direction; and "outer side in the tire radial direction" refers to the side distanced from the rotational axis in the tire radial direction. "Tire circumferential direction" refers to a circumferential direction with the rotational axis as a center axis. Additionally, "tire width direction" refers to the direction parallel to the rotational axis; "inner side in the tire width direction" refers to the side facing a tire equatorial plane CL (tire equator line) in the tire width direction; and "outer side in the tire width direction" refers to the side distanced from the tire equatorial plane CL in the tire width direction. "Tire equatorial plane CL" refers to a plane that is orthogonal to the rotational axis of the pneumatic tire 1 and that passes through a center of a tire width of the pneumatic tire 1. The tire width is a width in the tire width direction between constituents located to the outside in the tire width direction, or in other words, the distance between the constituents that are most distant in the tire width direction from the tire equatorial plane CL. "Tire equator line" refers to a line along the tire circumferential direction of the pneumatic tire 1 that lies on the tire equatorial plane CL. In this embodiment, "tire equator line" is given the same "CL" reference symbol as that used for the tire equatorial plane.

As illustrated in FIG. 1, the pneumatic tire 1 of this embodiment includes a tread portion 2, shoulder portions 3 on both sides of the tread portion 2, and a side wall portion 4 and a bead portion 5 continuing sequentially from each of the shoulder portions 3. Additionally, the pneumatic tire 1 includes a carcass layer 6, a belt layer 7, and a belt reinforcing layer 8.

The tread portion 2 is formed from a rubber material (tread rubber), is exposed on the outermost side in the tire radial direction of the pneumatic tire 1, and a surface thereof constitutes a profile of the pneumatic tire 1. A tread surface 21 is formed on a peripheral surface of the tread portion 2 or, rather, on a road contact surface that contacts a road surface when traveling. The tread surface 21 extends along the tire circumferential direction, and a plurality (four in this embodiment) of main grooves 22 that are straight main grooves parallel with the tire equator line CL are provided in the tread surface 21. Moreover, a plurality of rib-like land portions 23 extending along the tire circumferential direction and parallel with the tire equator line CL is formed in the tread surface 21 by the plurality of main grooves 22.

Additionally, while not explicitly illustrated in the drawings, lug grooves that intersect with the main grooves 22 in each of the land portions 23 are provided in the tread surface 21. The land portions 23 are plurally divided in the tire circumferential direction by the lug grooves. Additionally, the lug grooves are formed so as to open to an outermost side in the tire width direction of the tread portion 2, that is, the outer side in the tire width direction. Note that the lug grooves may have a form that communicates with the main grooves 22 or may have a form that does not communicate with the main grooves 22.

The shoulder portions 3 are locations on both outer sides in the tire width direction of the tread portion 2. Additionally, the side wall portions 4 are exposed at an outermost side in the tire width direction of the pneumatic tire 1. The bead portions 5 include a bead core 51 and a head filler 52. The bead core 51 is formed by winding a steel wire (bead wire) in a ring-like manner. The bead filler 52 is a rubber material that is disposed in space formed by ends of the carcass layer 6 in the tire width direction being folded up at a position of the bead core 51.

The ends of the carcass layer 6 in the tire width direction are folded over the pair of bead cores 51 from the inner side in the tire width direction to the outer side in the tire width direction, and the carcass layer 6 is stretched in a toroidal shape in the tire circumferential direction to form the framework of the tire. The carcass layer 6 is constituted by a plurality of carcass cords (not illustrated) juxtaposed in the tire circumferential direction along the tire meridian direction having a given angle with respect to the tire circumferential direction, and covered by a coating rubber. The carcass cords are formed from organic fibers (e.g. polyester, rayon, nylon, or the like). At least one layer of this carcass layer 6 is provided.

The belt layer 7 has a multi-layer structure where at least two layers (belts 71 and 72) are stacked; is disposed on an outer side in the tire radial direction that is the periphery of the carcass layer 6, in the tread portion 2; and covers the carcass layer 6 in the tire circumferential direction. The belts 71 and 72 are constituted by a plurality of cords (not illustrated) juxtaposed at a predetermined angle with respect to the tire circumferential direction (e.g. from 20 degrees to 30 degrees), and covered by a coating rubber. The cords are formed from steel or organic fibers (e.g. polyester, rayon, nylon, or the like). Moreover, the overlapping belts 71 and 72 are disposed so that the cords thereof mutually cross.

The belt reinforcing layer 8 is disposed on the outer side in the tire radial direction that is the periphery of the belt layer 7, and covers the belt layer 7 in the tire circumferential direction. The belt reinforcing layer 8 is constituted by a plurality of cords (not illustrated), juxtaposed in the tire width direction and substantially parallel (±5 degrees) to the tire circumferential direction, which are covered by a coating rubber. The cords are formed from steel or organic fibers (e.g. polyester, rayon, nylon, or the like). The belt reinforcing layer 8 illustrated in FIG. 1 is disposed so as to cover end portions in the tire width direction of the belt layer 7. The configuration of the belt reinforcing layer 8 is not limited to that described above. While not explicitly illustrated in the drawings, a configuration may be used where the belt reinforcing layer 8 is disposed so as to cover an entirety of the belt layer 7. Alternatively, for example, a configuration may be used where the belt reinforcing layer 8 has two reinforcing layers, where the belt reinforcing layer 8 is formed so that the reinforcing layer on the inner side in the tire radial direction is longer in the tire width direction than the belt layer 7 and disposed so as to cover the entirety of the belt layer 7, and the reinforcing layer on the outer side in the tire radial direction is disposed so as only to cover the end portions in the tire width direction of the belt layer 7. Alternatively, for example, a configuration may be used where the belt reinforcing layer 8 has two reinforcing layers, where each of the reinforcing layers is disposed so as only to cover the end portions in the tire width direction of the belt layer 7. In other words, the belt reinforcing layer 8 overlaps with at least the end portions in the tire width direction of the belt layer 7. Additionally, the belt reinforcing layer 8 is provided by winding band-like (e.g. with a width of 10 mm) strip material in the tire circumferential direction.

FIGS. 2 to 22 are partial perspective views of the pneumatic tire according to this embodiment, viewed from the tire width direction. As illustrated in FIGS. 2 to 22, with the pneumatic tire 1 configured as described above, a plurality of protrusions 9 protruding outward of the tire from a surface of a tire side portion S is provided on at least one tire side portion S, and a plurality of recesses 10 recessed inward of the tire from the surface of the tire side portion S is provided in the tire side portion S.

Here, the "tire side portion S" refers to, in FIG. 1, the outer side in the tire width direction from a ground contact edge T of the tread portion 2 or, in other words, a surface that uniformly continues in a range of the outer side in the tire radial direction from a rim check line L. Additionally, the "ground contact edge T" refers to both outermost edges in the tire width direction of a region in which the tread surface 21 of the tread portion 2 of the pneumatic tire 1 contacts the road surface when the pneumatic tire 1 is assembled on a regular rim and filled with regular inner pressure and 70% of a regular load is applied, and the ground contact edge T continues in the tire circumferential direction. Moreover, the "rim check line L" refers to a line used to confirm whether the tire has been assembled on the rim correctly and, typically, is an annular convex line closer to the outer side in the tire radial direction than a rim flange and continues in the tire circumferential direction along a portion adjacent to the rim flange on a front side surface of the bead portions 5.

Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO.

As illustrated in FIGS. 2 to 18, with the pneumatic tire 1 of this embodiment, the tire side portion S is divided into at least two regions in the tire radial direction, namely, a region F including at least the protrusions 9 and a region D including the recesses 10. Additionally, the region F including the protrusions 9 is provided on an outermost side in the tire radial direction and the region D including the recesses 10 is provided inward in the tire radial direction of the region including the protrusions 9.

The protrusions 9 are, for example, as illustrated in FIGS. 2 to 18, formed as convexities having a longitudinal shape in the tire radial direction that are formed from a rubber material (may be the rubber material forming the tire side portion S or a rubber material different from said rubber material) in a range of the tire side portion S, and a plurality of the protrusions 9 is disposed in the tire circumferential direction at a pitch. As illustrated in FIGS. 2 to 18, the region F including the protrusions 9 is a region between an imaginary line connecting ends on the outermost side in the tire radial direction of the protrusions 9 that are adjacent in the tire circumferential direction, and an imaginary line connecting ends on the innermost side in the tire radial direction of the protrusions 9 that are adjacent in the tire circumferential direction.

As illustrated in FIGS. 2 to 4 and FIGS. 6 to 15, the protrusions 9 may be disposed equidistantly in the tire circumferential direction or, as illustrated in FIG. 5 and FIGS. 16 to 18, a plurality of the protrusions 9 (two in the drawings) that are adjacent at a predetermined pitch in the tire circumferential direction may be configured as a group and this group of protrusions 9 may be disposed equidistantly in the tire circumferential direction.

Figure 15:
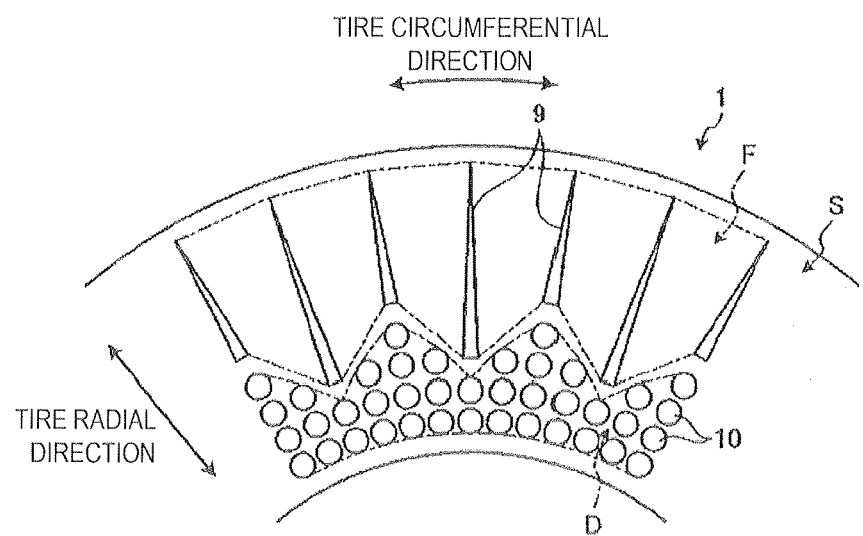
FIG. 15 is a partial perspective view of the pneumatic tire according to the embodiment of the present technology, viewed from the tire width direction.
Figure 16:
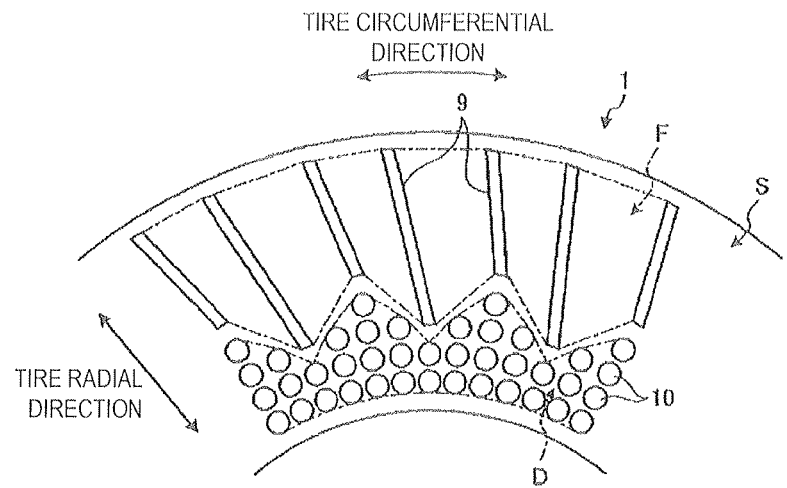
FIG. 16 is a partial perspective view of the pneumatic tire according to the embodiment of the present technology, viewed from the tire width direction.
Figure 17:
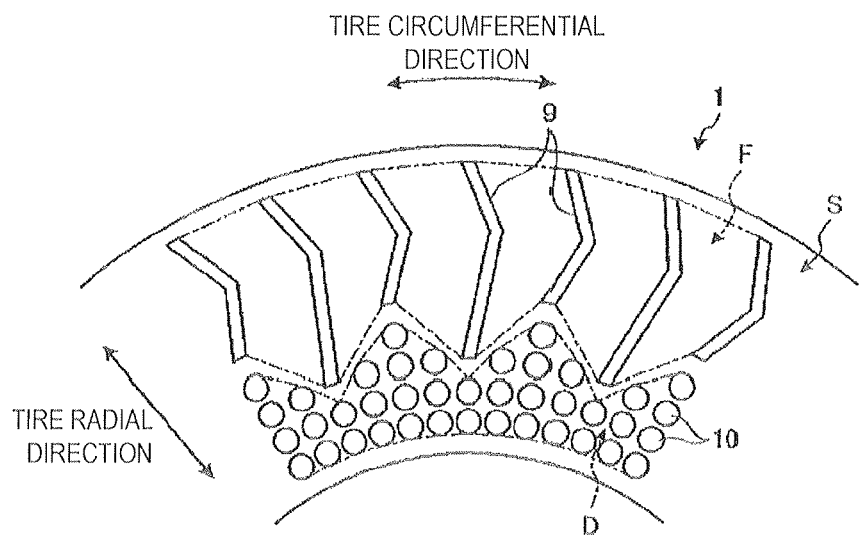
FIG. 17 is a partial perspective view of the pneumatic tire according to the embodiment of the present technology, viewed from the tire width direction.
Figure 18:
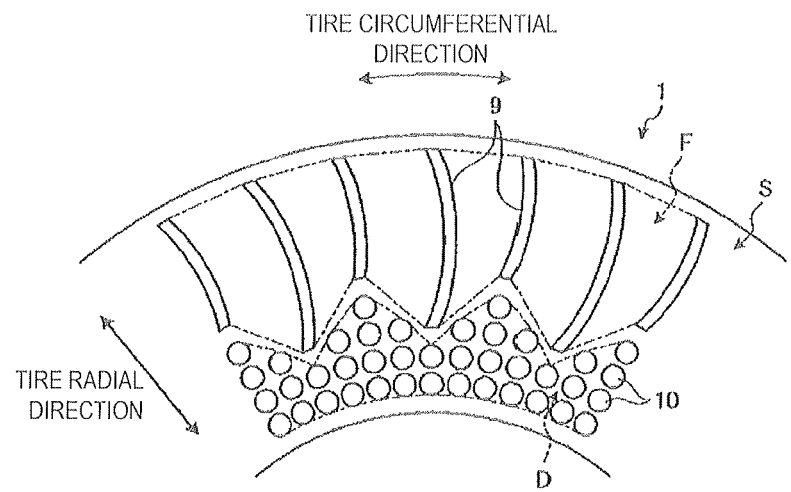
FIG. 18 is a partial perspective view of the pneumatic tire according to the embodiment of the present technology, viewed from the tire width direction.
Figure 19:
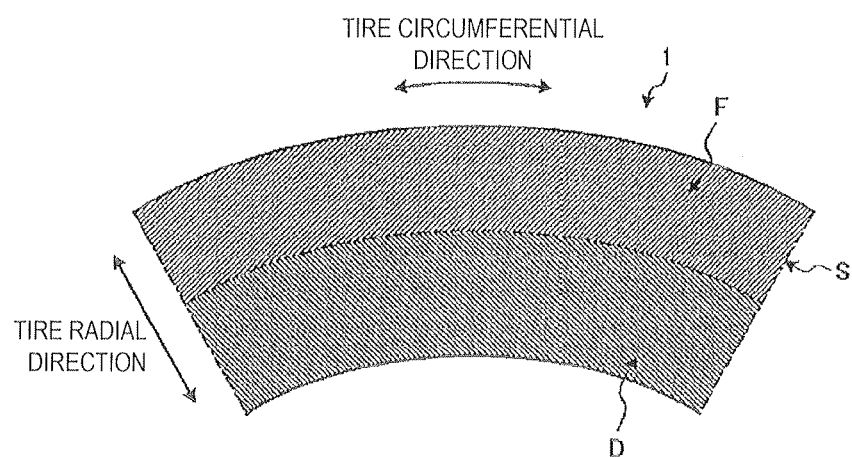
FIG. 19 is a partial perspective view of the pneumatic tire according to the embodiment of the present technology, viewed from the tire width direction.

Additionally, as illustrated in FIGS. 2 to 15, the protrusions 9 may be formed so as to have a linear form along the tire radial direction or, as illustrated in FIG. 16, may be formed so as to have a linear form that is inclined with respect to the tire radial direction. Alternatively, as illustrated in FIG. 17, the protrusions 9 may be formed so as to bend or, as illustrated in FIG. 18, may be formed so as to curve.

Additionally, as illustrated in FIGS. 10 to 18, the protrusions 9 may be disposed in the tire circumferential direction so as to have mutually differing lengths.

Figure 11:
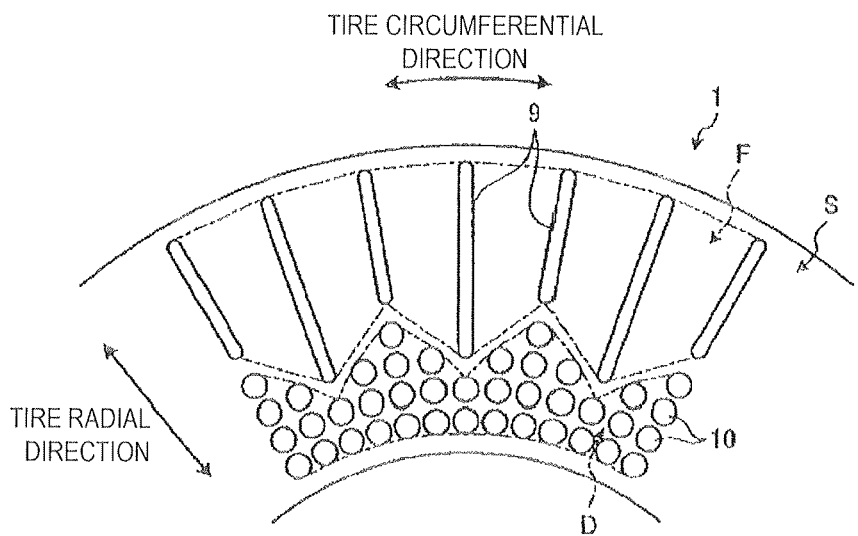
FIG. 11 is a partial perspective view of the pneumatic tire according to the embodiment of the present technology, viewed from the tire width direction.
Figure 12:
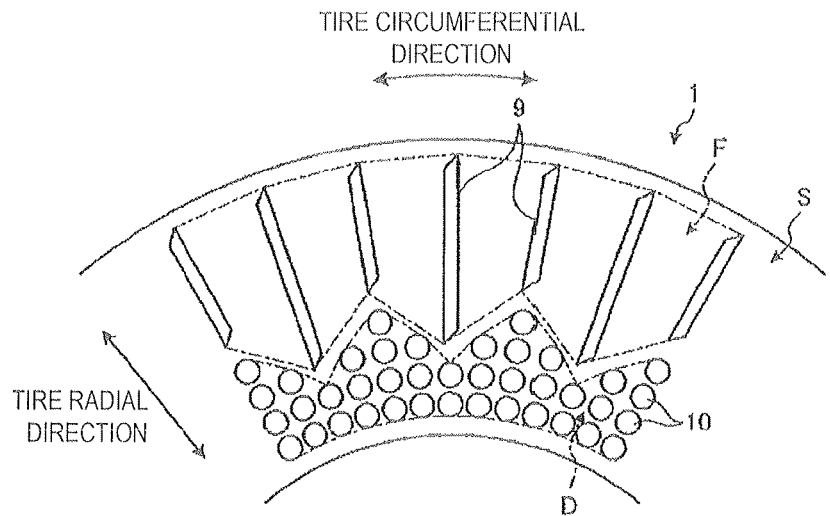
FIG. 12 is a partial perspective view of the pneumatic tire according to the embodiment of the present technology, viewed from the tire width direction.
Figure 13:
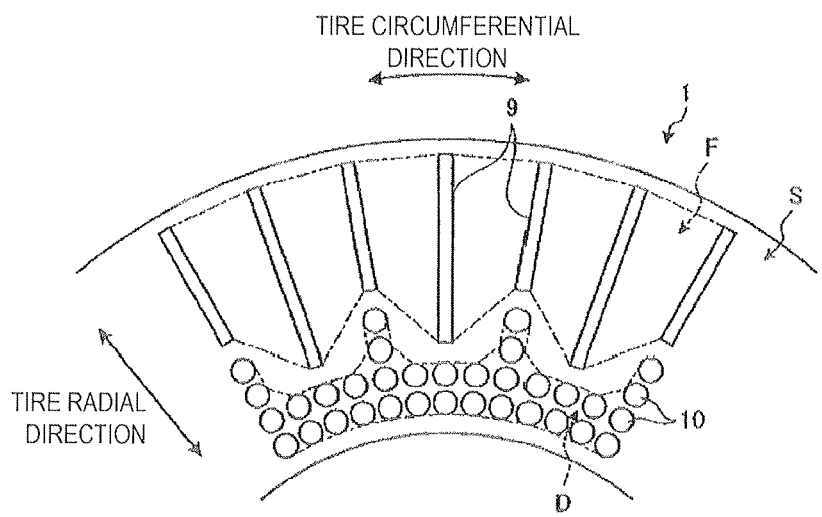
FIG. 13 is a partial perspective view of the pneumatic tire according to the embodiment of the present technology, viewed from the tire width direction.
Figure 14:
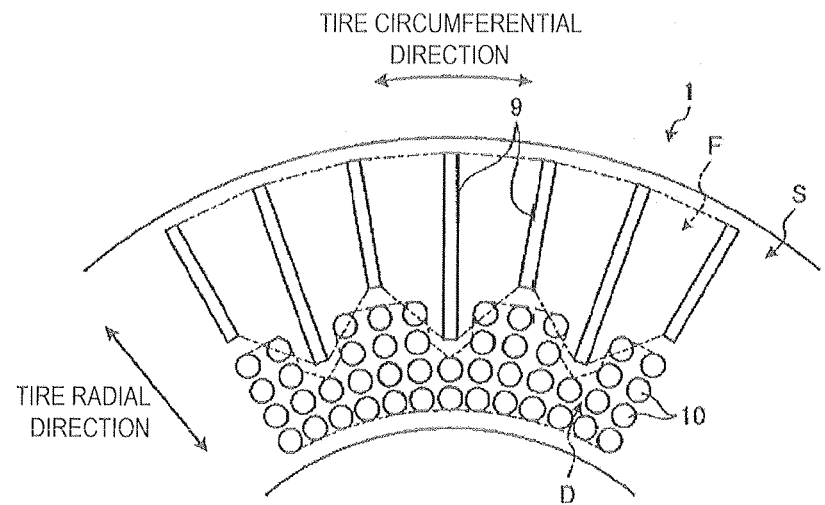
FIG. 14 is a partial perspective view of the pneumatic tire according to the embodiment of the present technology, viewed from the tire width direction.

As illustrated in FIGS. 2 to 10 and FIGS. 13 and 14, a shape of the protrusions 9 when viewed from the tire width direction may be rectangular. Alternatively, as illustrated in FIG. 11, the end portions of the protrusions 9 may be arc-shaped; as illustrated in FIG. 12, the end portions may be pointed; or as illustrated in FIG. 15, the end portions may be triangular. Additionally, as illustrated in FIG. 15, a width of the protrusions 9 (a dimension that crosses a longitudinal direction of the protrusions 9) may be formed so as to vary in the longitudinal direction.

Moreover, a cross-sectional shape orthogonal to the longitudinal direction of the protrusions 9 is formed so as to be semicircular, semi-elliptical, semi-oval, triangular, rectangular, or trapezoidal or, at least a portion of the cross-sectional shape has an arc. Here, "orthogonal to the longitudinal direction of the protrusions 9" means a direction that is orthogonal to the extending direction of the protrusions 9, and, in the case that the protrusions 9 are formed so as to curve, means a direction orthogonal to a line tangent to the curved portion.

Note that while not explicitly illustrated in the drawings, the protrusions 9 may be divided plurally in the longitudinal direction. In cases where the protrusions 9 are divided, another protrusion 9 lined up in the tire circumferential direction thereof may be disposed so as to overlap, in the tire circumferential direction, a division of a protrusion 9 adjacent in the tire circumferential direction.

An opening shape of the recesses 10 opening at the surface of the tire side portion S may be circular, elliptical, oval, polygonal, or the like (in FIGS. 2 to 18, circular opening shapes are illustrated). Moreover, a cross-sectional shape of the recesses 10 may be semicircular, semi-elliptical, semi-oval, rounded cone shaped, rectangular, or the like. As illustrated in FIGS. 2 to 18, the region D including the recesses 10 is a region between an imaginary line connecting edges of adjacent recesses 10 that are closest to the outermost side in the tire radial direction, and an imaginary line connecting edges of adjacent recesses 10 that are closest to the innermost side in the tire radial direction.

Figure 3:
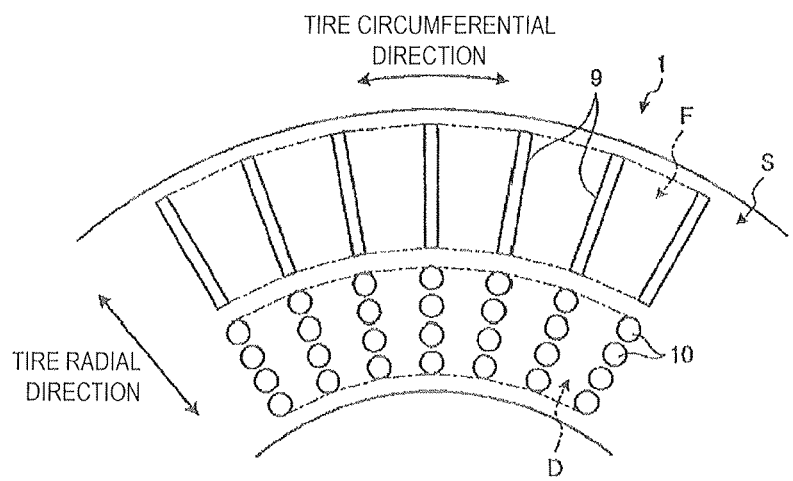
FIG. 3 is a partial perspective view of the pneumatic tire according to the embodiment of the present technology, viewed from the tire width direction.
Figure 4:
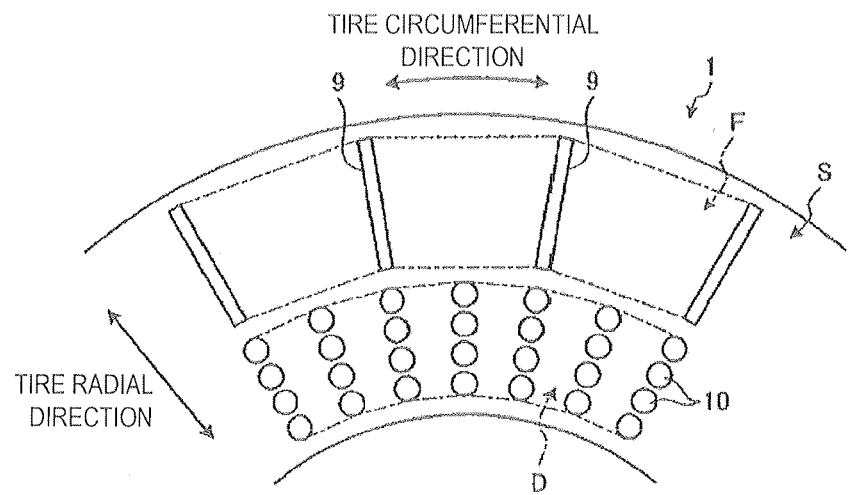
FIG. 4 is a partial perspective view of the pneumatic tire according to the embodiment of the present technology, viewed from the tire width direction.
Figure 5:
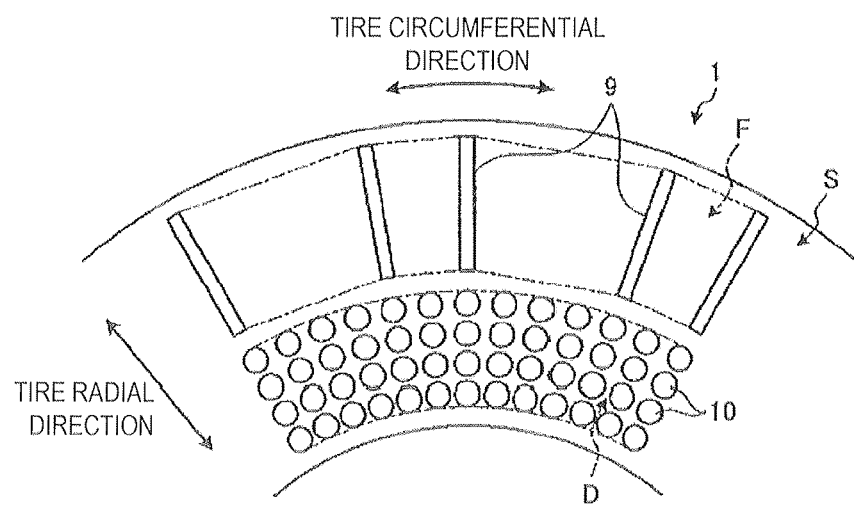
FIG. 5 is a partial perspective view of the pneumatic tire according to the embodiment of the present technology, viewed from the tire width direction.
Figure 6:
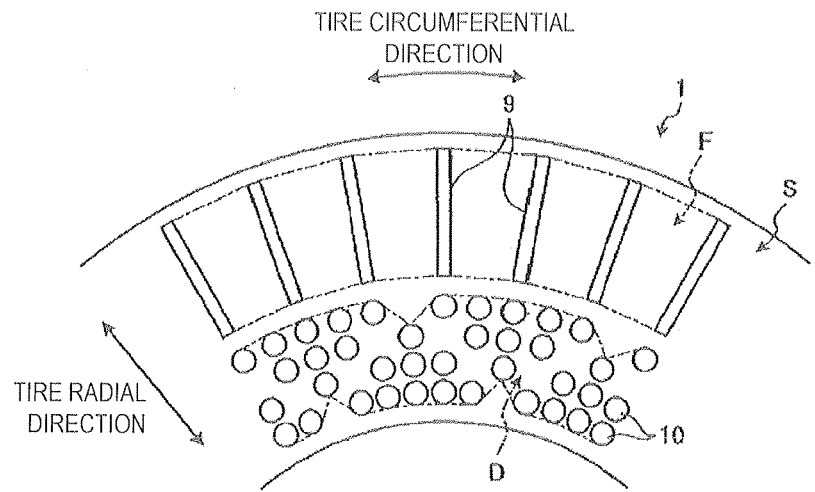
FIG. 6 is a partial perspective view of the pneumatic tire according to the embodiment of the present technology, viewed from the tire width direction.
Figure 7:
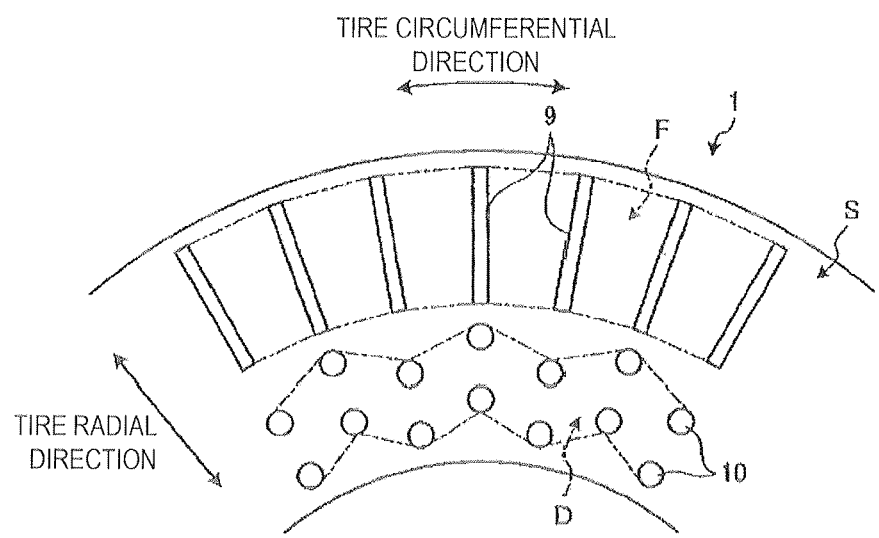
FIG. 7 is a partial perspective view of the pneumatic tire according to the embodiment of the present technology, viewed from the tire width direction.
Figure 8:
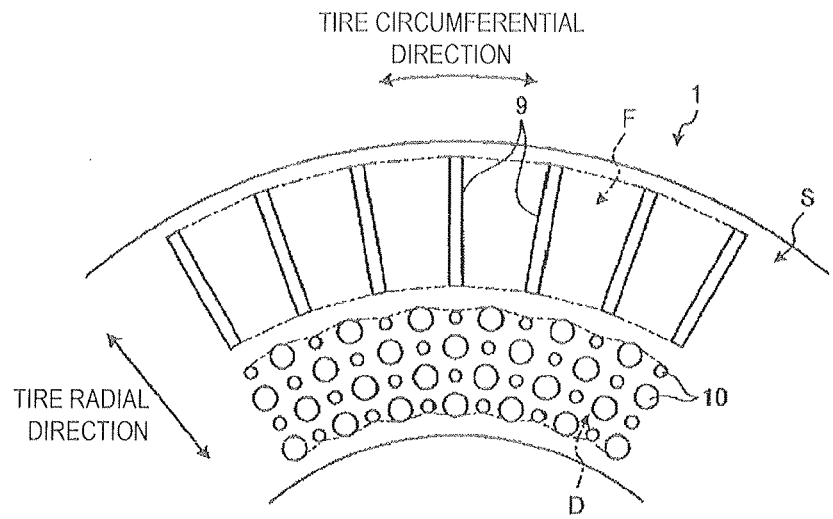
FIG. 8 is a partial perspective view of the pneumatic tire according to the embodiment of the present technology, viewed from the tire width direction.
Figure 9:
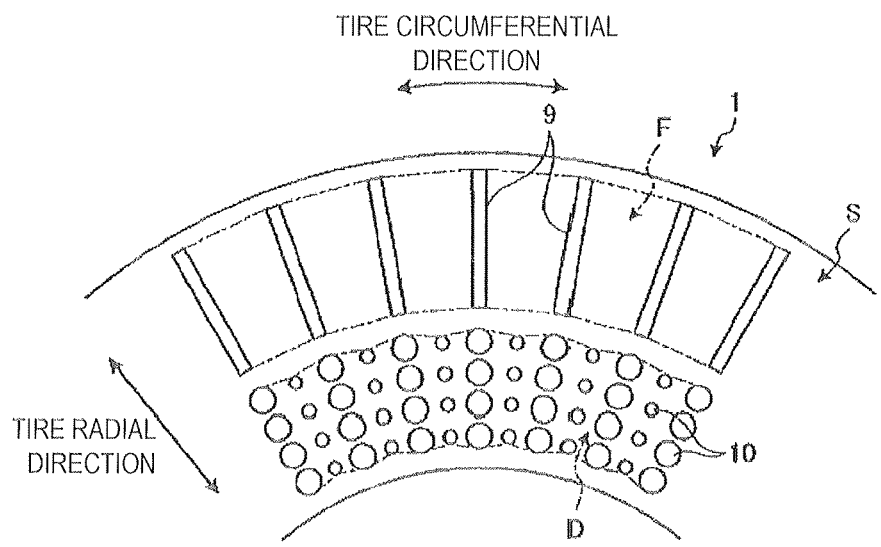
FIG. 9 is a partial perspective view of the pneumatic tire according to the embodiment of the present technology, viewed from the tire width direction.
Figure 10:
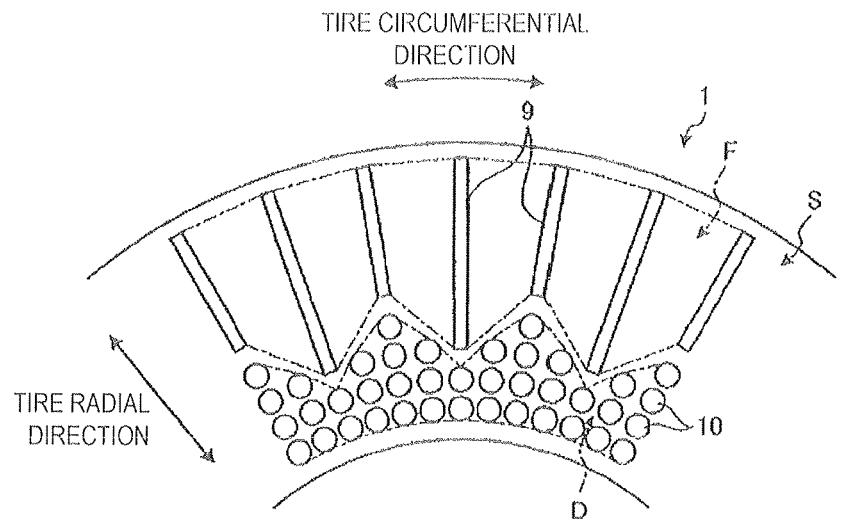
FIG. 10 is a partial perspective view of the pneumatic tire according to the embodiment of the present technology, viewed from the tire width direction.

As illustrated in FIGS. 2 to 5, the recesses 10 may be disposed equidistantly in the tire circumferential direction and the tire radial direction and, as illustrated in FIG. 3, the recesses 10 may be disposed along the tire radial direction along which the protrusions 9 are disposed. Additionally, as illustrated in FIG. 6, the recesses 10 may be disposed so as to have a void in a portion equidistantly disposed in the tire circumferential direction and the tire radial direction. Moreover, as illustrated in FIG. 7, the recesses 10 may be disposed so as to have a void in a portion disposed along the tire radial direction along which the protrusions 9 are disposed. Furthermore, as illustrated in FIGS. 8 and 9, the recesses 10 may be disposed having different sizes. Additionally, as illustrated in FIGS. 10 to 18, the recesses 10 may be disposed in peaks and valleys so as to correspond to the protrusions 9 that are disposed in the tire circumferential direction so as to have mutually differing lengths. Moreover, while not explicitly illustrated in the drawings, the recesses 10 may be disposed in a staggered manner, or may be disposed in a rectangular- or triangular-based manner.

Figure 20:
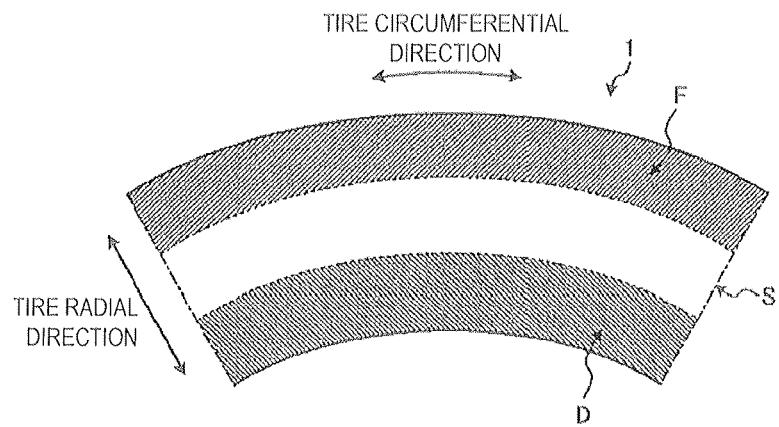
FIG. 20 is a partial perspective view of the pneumatic tire according to the embodiment of the present technology, viewed from the tire width direction.
Figure 21:
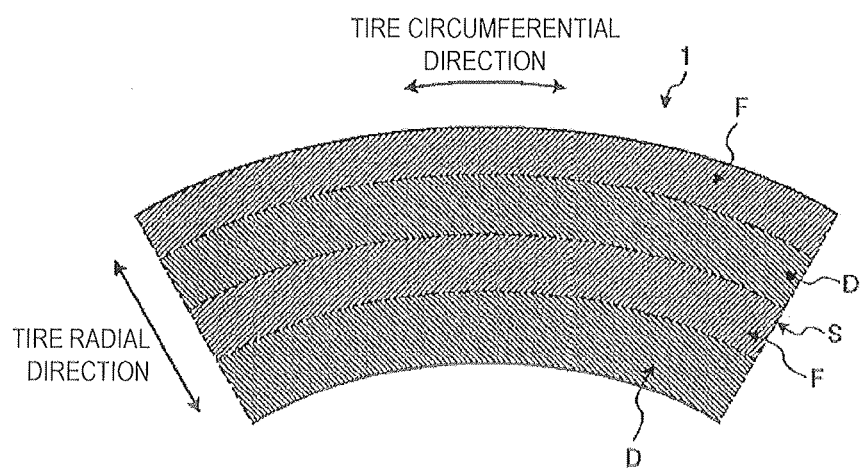
FIG. 21 is a partial perspective view of the pneumatic tire according to the embodiment of the present technology, viewed from the tire width direction.
Figure 22:
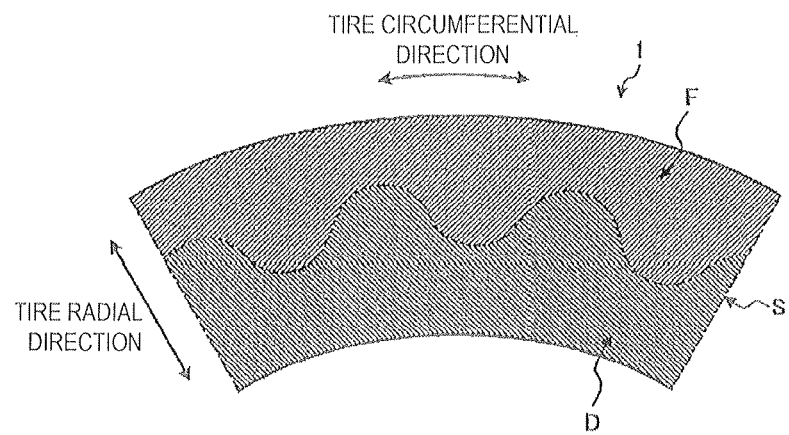
FIG. 22 is a partial perspective view of the pneumatic tire according to the embodiment of the present technology, viewed from the tire width direction.

As described above, the tire side portion S of this embodiment is divided into at least two regions in the tire radial direction, namely, the region D including the recesses 10 and the region F including the protrusions 9. The region F including the protrusions 9 is provided on the outermost side in the tire radial direction and the region D including the recesses 10 is provided inward in the tire radial direction of the region F including the protrusions 9 (see FIG. 19). Additionally, as illustrated in FIG. 20, with the region D including the recesses 10 and the region F including the protrusions 9, the region F including the protrusions 9 may be provided on the outermost side in the tire radial direction and the region D including the recesses 10 may be provided on the innermost side in the tire radial direction, and a region where the protrusions 9 and the recesses 10 are not provided may be provided between the region F and the region D in the tire radial direction. Additionally, as illustrated in FIG. 21, with the region D including the recesses 10 and the region F including the protrusions 9, the region F including the protrusions 9 may be provided on the outermost side in the tire radial direction and the region D including the recesses 10 may be provided on the innermost side in the tire radial direction, and another region F and another region D may be provided between the region F and the region D in the tire radial direction. Moreover, as illustrated in FIG. 22, a boundary between the region D including the recesses 10 and the region F including the protrusions 9 may be provided so as to be wavelike in the tire circumferential direction or, as illustrated in FIGS. 10 to 13 and FIGS. 15 to 18, the boundary may be provided so as to be saw-toothed (zig-zagged) in the tire circumferential direction. Furthermore, as illustrated in FIG. 14, the boundary between the region D including the recesses 10 and the region F including the protrusions 9 may be provided so that the region D and the region F overlap.

In the tire side portions S on both sides in the tire width direction, the protrusions 9 and the recesses 10 may be provided with identical arrangements or may be provided with differing arrangements. Additionally, in the tire side portions S on both sides in the tire width direction, the region D including the recesses 10 and the region F including the protrusions 9 may be provided with identical arrangements or differing arrangements.

Thus, the pneumatic tire 1 of this embodiment includes the plurality of protrusions 9 and the plurality of recesses 10 of at least one tire side portion S; the protrusions 9 are formed as convexities having a longitudinal shape in a predetermined direction; the region F including the protrusions 9 is provided on the outermost side in the tire radial direction; and the region D including the recesses 10 is provided inward in the tire radial direction of the region F including the protrusions 9.

When a vehicle on which the pneumatic tire 1 is mounted is traveling, by providing the region F including the protrusions 9 on the outer side in the tire radial direction of the tire side portion S where air resistance is prone to be received and rotation speed is relatively fast, the air will be made turbulent by the protrusions 9. Therefore, a turbulent flow boundary layer is generated in the region F including the protrusions 9 and expansion of passing air can be suppressed. As a result, the air resistance of the vehicle is reduced and the fuel economy is enhanced. On the other hand, when a vehicle on which the pneumatic tire 1 is mounted is traveling, rubber volume of the tire side portion S is reduced due to the recesses 10 and the air is made turbulent by providing the region D including the recesses 10 on the inner side in the tire radial direction of the tire side portion S, where the rotation speed is relatively slow. Therefore, tire heat buildup and temperature increases can be suppressed and the durability of the tire is enhanced because heat dissipation is enhanced due to the air being made turbulent while generation of heat is suppressed due to the reduction in rubber volume. As described above, with this pneumatic tire 1, it is possible to further improve the air flow around the tire due to the protrusions 9 on the outer side in the tire radial direction and the recesses 10 on the inner side in the tire radial direction of the tire side portion S.

As illustrated in FIG. 1, with the pneumatic tire 1 according this embodiment, in a state when assembled on a regular rim and inflated to an inner pressure of 5% of a regular inner pressure, the region F including the protrusions 9 is preferably a range FH of at least 10% of a tire cross-sectional height H outward from a ground contact edge T of the tread portion 2 in the tire width direction and inward from the ground contact edge T in the tire radial direction; and the region D including the recesses 10 is preferably a range DH of at least 10% of the tire cross-sectional height H outward from the rim check line L in the tire radial direction.

Here, "tire cross-sectional height H" refers to a height of the tire along the tire radial direction from an inner edge of the bead portion 5 in the tire radial direction (rim base position) to a tread surface 21 on the outermost side in the tire radial direction (crown center).

The range FH of at least 10% of a tire cross-sectional height H outward from a ground contact edge T of the tread portion 2 in the tire width direction and inward in the tire radial direction from the ground contact edge T is a portion in the tire side portion S that is most prone to receiving the air resistance and where the rotation speed is fastest. By configuring this range FH to be the region F including the protrusions 9, a prominent effect of reducing the air resistance of the vehicle can be obtained and the fuel economy can be further enhanced. On the other hand, the range DH of at least 10% of the tire cross-sectional height H outward from the rim check line L in the tire radial direction is a portion in the tire side portion S where the rotation speed is slowest. By configuring this range DH to be the region D including the recesses 10, a prominent effect of suppressing tire heat buildup and temperature increases can be obtained, and the durability of the tire can be further enhanced. Note that setting maximum values of the regions FH and DH to 70% of the tire cross-sectional height H is preferable because the effects of the protrusions 9 and the recesses 10 that are obtained will be prominent. Additionally, setting the regions FH and DH to 50% of the tire cross-sectional height H is more preferable because the protrusions 9 and the recesses 10 will reach the position in the tire cross-sectional width where the width is substantially the greatest, and the effects of the protrusions 9 and the recesses 10 will be divided substantially evenly in the tire radial direction. When the pneumatic tire 1 is assembled on a regular rim, inflated to a regular inner pressure, and in an unloaded state, the "tire cross-sectional width" is a distance in the tire width direction found by excluding design and alphanumeric portions from a total tire width, i.e. a linear distance in the tire width direction between the side wall portions 4 including all designs or alphanumerics on the side faces.

With the pneumatic tire 1 of this embodiment, a longitudinal direction dimension of the protrusions 9 is preferably not less than 5 mm.

If the longitudinal direction dimension of the protrusions 9 is less than 5 mm, it will be difficult to obtain the effect of making the air turbulent by the protrusions 9. Therefore, configuring the longitudinal direction dimension of the protrusions 9 to be not less than 5 mm makes it possible to make the air turbulent and obtain a prominent effect of reducing the air resistance of the vehicle.

With the pneumatic tire 1 of this embodiment, a protruding height of the protrusions 9 is preferably not less than 0.5 mm and not more than 10.0 mm.

If the height of the protrusions 9 is less than 0.5 mm, a range of the protrusions 9 that contacts the air will be small and, as a result, it will be difficult to make the flow of air turbulent and the effect of reducing the air resistance of the vehicle will decline. Additionally, if the height of the protrusions 9 exceeds 10.0 mm, the range of the protrusions 9 that contacts the air will be large and, as a result, the flow of air at the back of the protrusions 9 will tend to expand and the effect of reducing the air resistance of the vehicle will decline. On this point, according to the pneumatic tire 1 of this embodiment, the protrusions 9 appropriately contact the air and, therefore, the flow of air is made turbulent and the expansion of the air at the back of the protrusions 9 is reduced. As a result, a prominent effect of reducing the air resistance of the vehicle can be obtained. Note that the height of the protrusions 9 is preferably configured to be not less than 1 mm and not more than 5 mm because a more prominent effect of reducing the air resistance of the vehicle will be obtained. Note that the range of the height of the protrusions 9 that is not less than 0.5 mm and not more than 10.0 mm is preferable for pneumatic tires for passenger cars. However, the range is not limited thereto for pneumatic tires having large diameters such as heavy duty pneumatic tires, and the range of the height may exceed that for passenger cars.

With the pneumatic tire 1 of this embodiment, a longitudinal direction of the protrusions 9 is preferably disposed along the tire radial direction.

The protrusions 9 formed with the longitudinal shape in the tire radial direction have many faces facing the air passing around the tire and make the air more turbulent. Therefore, a prominent effect of reducing the air resistance of the vehicle can be obtained.

With the pneumatic tire 1 of this embodiment, a cross-sectional shape of the protrusions 9 preferably includes a peak and progressively expands toward a bottom surface side.

That is, the cross-sectional shape of the protrusions 9 that is orthogonal to the longitudinal direction resembles a triangle shape and, thereby, the volume of the protrusions 9 is less compared to that of a rectangular cross-section or the like. As a result, the rubber volume of the protrusions 9 is reduced and an increase in tire weight is suppressed and, therefore, the fuel economy can be further enhanced.

With the pneumatic tire 1 of this embodiment, the cross-sectional shape of the protrusions 9 preferably includes at least one arc.

Figure 23:
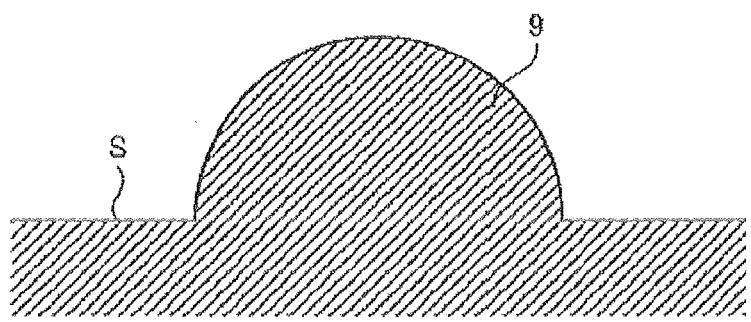
FIG. 23 is a cross-sectional view of a protrusion.
Figure 24:
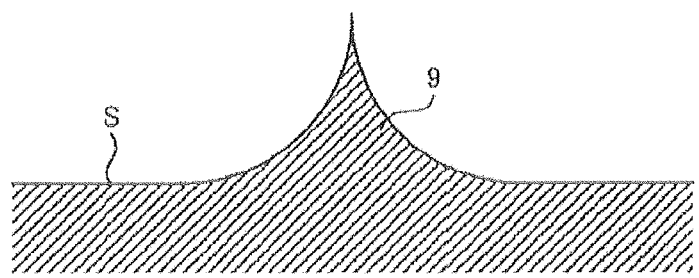
FIG. 24 is a cross-sectional view of a protrusion.

For example, as illustrated in FIG. 23 (a cross-sectional view of a protrusion), the cross-sectional shape of the protrusions 9 may be formed so as to expand using an arc or, as illustrated in FIG. 24 (a cross-sectional view of a protrusion), the cross-sectional shape of the protrusions 9 may be formed so that the are is recessed. As a result, because the volume of the protrusions 9 is less compared to that of a rectangular cross-section or the like, the rubber volume of the protrusions 9 is reduced and an increase in tire weight is suppressed and, therefore, the fuel economy can be further enhanced.

With the pneumatic tire 1 of this embodiment, a depth of the recesses 10 is preferably not less than 0.5 mm and not more than 5.0 mm.

If the depth of the recesses 10 is less than 0.5 mm, a range where an inner surface of the recesses 10 contacts the air will be small and, as a result, it will be difficult to make the flow of air turbulent. Additionally, if the depth of the recesses 10 exceeds 5.0 mm, the range where the inner surface of the recesses 10 contacts the air will be excessive and, in addition to the air resistance tending to increase, the original rubber volume in the region including the recesses 10 will increase, which will lead to an increase in tire weight. On this point, according to the pneumatic tire 1 of this embodiment, the inner surface of the recesses 10 appropriately contacts the air and, therefore, the flow of air can be appropriately made turbulent. As a result, a prominent effect of enhancing the heat dissipation can be obtained. Note that the range of the depth of the recesses 10 that is not less than 0.5 mm and not more than 5.0 mm is preferable for pneumatic tires for passenger cars. However, the range is not limited thereto for pneumatic tires having large diameters such as heavy duty pneumatic tires, and the range of the depth may exceed that for passenger cars.

With the pneumatic tire 1 of this embodiment, the recesses 10 are preferably disposed such that a volume varies so as to progressively increase toward the inner side in the tire radial direction.

Figure 25:
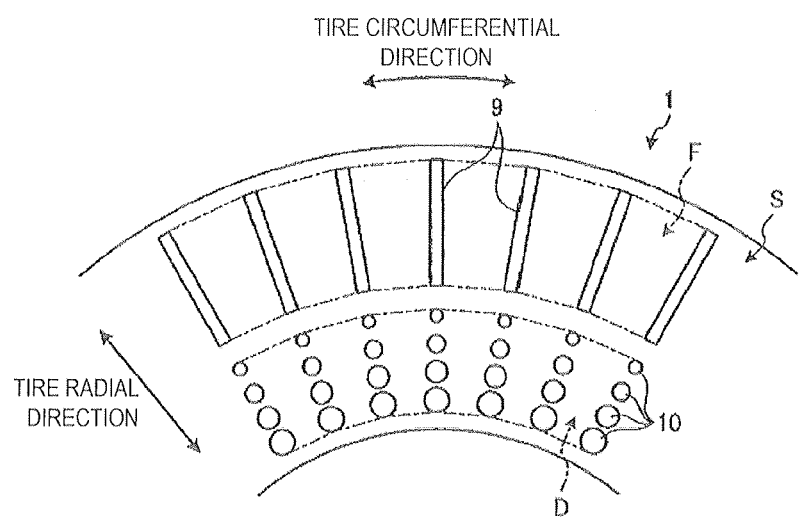
FIG. 25 is a partial perspective view of the pneumatic tire according to the embodiment of the present technology, viewed from the tire width direction.

The volume of the recesses 10 varies depending on the depth of the recesses 10 and an area of the openings of the recesses 10. For example, as illustrated in FIG. 25 (a partial perspective view of the pneumatic tire according to this embodiment, viewed from the tire width direction), by configuring the depth of the recesses 10 to be constant and the area of the openings to vary and progressively increase toward the inner side in the tire radial direction, the volumes of the recesses 10 can be made so as to progressively increase toward the inner side in the tire radial direction. Thus, the rubber volume of the portion on the inner side in the tire radial direction, where the volume of disposed rubber is relatively great and heat buildup is relatively great, will be reduced. Therefore, heat dissipation due to the air being made turbulent can be further enhanced while the generation of heat is suppressed, tire heat buildup and temperature increases can be suppressed, and the durability of the tire can be further enhanced.

The pneumatic tire 1 described above can be used as a passenger car pneumatic tire and also as a heavy duty or run-flat pneumatic tire. When used as a passenger car pneumatic tire, the effects described above can be obtained. When used as a heavy duty pneumatic tire, particularly under heavy loads, deformations of the tire when the tire side portion S is compressed are further suppressed by the protrusions 9, and increases in temperature when the tire side portion S is compressed are suppressed by the recesses 10. Therefore, durability is enhanced. Also, when used as a run-flat pneumatic tire, particularly when punctured, deformations of the tire when the tire side portion S is compressed are further suppressed by the protrusions 9, and increases in temperature when the tire side portion S is compressed are suppressed by the recesses 10. Therefore, durability is enhanced.

EXAMPLES

In the examples, performance testing for fuel economy, pinch cut resistance, and load durability was performed on a plurality of types of pneumatic tires under different conditions (see FIGS. 26a-b).

In this performance testing, a pneumatic tire having a tire size of 185/65R15 was assembled on a regular rim and inflated to a regular inner pressure.

Fuel economy performance testing: The pneumatic tire was mounted on a compact front-wheel drive vehicle having an engine displacement of 1,500 cc+motor assist drive. Fuel economy was measured for a case where the test vehicle was driven 50 laps on a 2 km (total length) test course at a speed of 100 km/h. Based on the measurement results, the fuel economy improvement rates were indexed with the index score of the pneumatic tire of the Conventional Example (100) being a reference. Greater index scores indicate enhanced fuel economy improvement rates.

Pinch cut resistance performance testing: A degree of external damage that the side wall portion received (length of scratch and depth of scratch) was measured when the test vehicle was driven forward and over a curb (curb height: 110 mm) at an angle of 30° with respect to the curb. This performance testing was performed for each tire at increasing speed increments of 5 km/hr, starting from 10 km/h, until the tire burst or air leakage occurred. Based on the measurement results, the pinch cut resistance was indexed with the index score of the pneumatic tire of the Conventional Example (100) being a reference. Greater index scores indicate enhanced pinch cut resistance.

Load durability performance testing: The pneumatic tire described above was mounted on a regular rim and inflated to an internal pressure of 180 kPa. Using a drum test machine having a flat, steel drum surface and a diameter of 1,707 mm, total running distance at a speed of 81 km/h was measured for this pneumatic tire in a controlled environment where ambient temperature was 38±3° C. The pneumatic tire was subjected to increasing load increments of 13% every two hours, starting at 88% of the maximum load stipulated by JATMA, until the tire failed. Based on the measurement results, the load durability was indexed with the index score of the pneumatic tire of the Conventional Example (100) being a reference. Greater index scores indicate enhanced load durability.

In FIGS. 26a-b, the pneumatic tire of the Conventional Example did not include the protrusions and the recesses of the tire side portions of both sides. Additionally, the pneumatic tire of Comparative Example 1 included protrusions on an outer side region in the tire radial direction of the tire side portions of both sides (intermediate portion between the ground contact edge and the position where the tire cross-sectional width is greatest), and did not include the recesses. The pneumatic tire of Comparative Example 2 included recesses in an inner side region in the tire radial direction of the tire side portions of both sides (intermediate portion between the rim check line and the position where the tire cross-sectional width is greatest), and did not include the protrusions. The pneumatic tire of Comparative Example 3 included the protrusions on an outer side region in the tire radial direction of the tire side portions of both sides (intermediate portion between the ground contact edge and the position where the tire cross-sectional width is greatest) and on the inner side region in the tire radial direction of the tire side portions of both sides (intermediate portion between the rim check line and the position where the tire cross-sectional width is greatest). The pneumatic tire of Comparative Example 4 included the recesses in an outer side region in the tire radial direction of the tire side portions of both sides (intermediate portion between the ground contact edge and the position where the tire cross-sectional width is greatest) and in the inner side region in the tire radial direction of the tire side portions of both sides (intermediate portion between the rim check line and the position where the tire cross-sectional width is greatest). Note that when the protrusions were included, the length along the tire radial direction was uniform and the protrusions were disposed equidistantly in the tire circumferential direction. When the recesses were included, the recesses were juxtaposed along the tire radial direction and equidistantly disposed in the tire circumferential direction.

On the other hand, in FIGS. 26a-b, the pneumatic tires of Working Examples 1 to 8 included the protrusions on the outer side in the tire radial direction of the tire side portions of both sides, and included the recesses on the inner side in the tire radial direction of the tire side portions of both sides. Note that the length along the tire radial direction of the protrusions was uniform and the protrusions were disposed equidistantly in the tire circumferential direction. The recesses were disposed inward in the tire radial direction of the protrusions, were juxtaposed along the tire radial direction, and equidistantly disposed in the tire circumferential direction (see FIG. 3). The pneumatic tire of Working Example 1 included the protrusions on an outer side region in the tire radial direction of the tire side portions of both sides (intermediate portion between the ground contact edge and the position where the tire cross-sectional width is greatest), and included recesses in the inner side region in the tire radial direction of the tire side portions of both sides (intermediate portion between the rim check line and the position where the tire cross-sectional width is greatest). Additionally, the pneumatic tires of Working Examples 2 to 8, in a state when assembled on a regular rim and inflated to an inner pressure of 5% of a regular inner pressure, the protrusions were provided on the outer side region in the tire radial direction of the tire side portions of both sides (range of 10% of the tire cross-sectional height inward from the ground contact edge in the tire radial direction), and the recesses were provided in the inner side region in the tire radial direction of the tire side portions of both sides (range of 10% of the tire cross-sectional height outward from the rim check line in the tire radial direction). With the pneumatic tires of Working Examples 3 to 8, the longitudinal direction dimension of the protrusions is further configured to the stipulated value. With the pneumatic tires of Working Examples 4 to 8, the protruding height of the protrusions and the depth of the recesses are further configured to the stipulated values. With the pneumatic tire of Working Example 6, the cross-sectional shape of the protrusions is configured to be triangular (isosceles triangular). With the pneumatic tires of Working Examples 7 and 8, the cross-sectional shape of the protrusions is formed to be triangular (isosceles triangular) in which two sides are formed as recessed arcs (see FIG. 24). With the pneumatic tire of Working Example 8, the volume of the recesses varies in the tire radial direction. The recesses having a circular opening shape are configured so that the opening radius is in a range from 0.3 to 2 mm and the depth is in a range from 3 to 4 mm. The recesses with the smallest volume were disposed on the outer side in the tire radial direction and the volume varied so as to progressively increase toward the inner side in the tire radial direction (see FIG. 25).

As shown in the evaluation results of FIGS. 26a-b, it is clear that the fuel economy, the pinch cut resistance, and the load durability were enhanced with the pneumatic tires of Working Examples 1 to 8.

What is claimed is:

1. A pneumatic tire comprising a plurality of protrusions and a plurality of recesses on at least one tire side portion; wherein
   the protrusions are formed as convexities having a longitudinal shape in a tire radial direction;
   a region including the protrusions is a region between a first imaginary line connecting outer ends on an outermost side in the tire radial direction of the protrusions that are adjacent in a tire circumferential direction and a second imaginary line connecting inner ends on an innermost side in the tire radial direction of the protrusions that are adjacent in the tire circumferential direction;
   a region including the recesses is a region between a third imaginary line connecting edges of adjacent radially outermost recesses and a fourth imaginary line connecting edges of adjacent radially innermost recesses;
   the region including the recesses is entirely radially inward of the second imaginary line;
   the region including the protrusions is entirely radially outward of the third imaginary line;
   the second imaginary line and the third imaginary line extend in a wave or zigzag shape in the tire circumferential direction, and radially overlap each other in the tire circumferential direction; and
   at each circumferential point, the second imaginary line is radially outward of the third imaginary line.

2. The pneumatic tire according to claim 1, wherein
   in a state when assembled on a regular rim and inflated to an inner pressure of 5% of a regular inner pressure;
   the first imaginary line is on a ground contact edge of a tread portion;
   the second imaginary line is radially inward of a position of at least 10% of a tire cross-sectional height inward from the ground contact edge in the tire radial direction;
   the third imaginary line is on a rim check line; and
   the fourth imaginary line is radially outward of a position of at least 10% of a tire cross-sectional height outward from the rim check line in the tire radial direction.

3. The pneumatic tire according to claim 1, wherein a longitudinal direction dimension of the protrusions is not less than 5 mm.

4. The pneumatic tire according to claim 1, wherein a protruding height of the protrusions is not less than 0.5 mm and not more than 10.0 mm.

5. The pneumatic tire according to claim 1, wherein a longitudinal direction of the protrusions is disposed along the tire radial direction.

6. The pneumatic tire according to claim 1, wherein a cross-sectional shape of the protrusions comprises a peak and progressively expands toward a bottom surface side.

7. The pneumatic tire according to claim 1, wherein a cross-sectional shape of the protrusions comprises at least one arc.

8. The pneumatic tire according to claim 1, wherein a depth of the recesses is not less than 0.5 mm and not more than 5.0 mm.

9. The pneumatic tire according to claim 1, wherein the recesses are disposed such that a volume varies so as to progressively increase toward the innermost side in the tire radial direction.

10. The pneumatic tire according to claim 1, wherein maximum values of a distance FH from the first imaginary line to the second imaginary line in the tire radial direction and a distance DH from the third imaginary line to the fourth imaginary line in the tire radial direction are respectively not more than 70% of the tire cross-sectional height.

11. The pneumatic tire according to claim 1, wherein maximum values of a distance FH from the first imaginary line to the second imaginary line in the tire radial direction and a distance DH from the third imaginary line to the fourth imaginary line in the tire radial direction are respectively not more than 50% of the tire cross-sectional height.

12. The pneumatic tire according to claim 1, wherein in a state when assembled on a regular rim and inflated to an inner pressure of 5% of a regular inner pressure, the first imaginary line is on a ground contact edge of a tread portion, and the second imaginary line is radially inward of a position of at least 10% of a tire cross-sectional height inward from the ground contact edge in the tire radial direction.

13. The pneumatic tire according to claim 1, wherein in a state when assembled on a regular rim and inflated to an inner pressure of 5% of a regular inner pressure, the third imaginary line is on a rim check line, and the fourth imaginary line is radially outward of a position of at least 10% of a tire cross-sectional height outward from the rim check line in the tire radial direction.

14. The pneumatic tire according to claim 1, wherein the longitudinal shape is disposed along the tire radial direction, with a longitudinal direction dimension of the protrusions being not less than 5 mm and having a protruding height of not less than 0.5 mm and not more than 10.0 mm.

15. The pneumatic tire according to claim 1, wherein a longitudinal direction of the protrusions is disposed along the tire radial direction and wherein the recesses are disposed such that a volume varies so as to progressively increase toward the innermost side in the tire radial direction.

16. The pneumatic tire according to claim 1, wherein a longitudinal direction of the protrusions is disposed along the tire radial direction and a cross-sectional shape of the protrusions comprises at least one arc.

17. The pneumatic tire according to claim 1, wherein the protrusions are discrete and spaced apart from one another.

18. The pneumatic tire according to claim 1, wherein the second imaginary line of the region including the protrusions and the third imaginary line of the region including the recesses do not intersect each other.

19. The pneumatic tire according to claim 1, wherein the second imaginary line of the region including the protrusions and the third imaginary line of the region including the recesses intersect each other.

* * * * *